US007392131B2

(12) United States Patent
Haseloff

(10) Patent No.: US 7,392,131 B2
(45) Date of Patent: Jun. 24, 2008

(54) METHOD FOR SUPPLYING A PROGRAM-AIDED INFORMATION SYSTEM WITH SPECIFIC POSITIONAL INFORMATION

(75) Inventor: Sandra Haseloff, Dortmund (DE)

(73) Assignee: Franuhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 10/502,035

(22) PCT Filed: Jan. 15, 2003

(86) PCT No.: PCT/EP03/00362

§ 371 (c)(1), (2), (4) Date: Nov. 17, 2004

(87) PCT Pub. No.: WO03/060853

PCT Pub. Date: Jul. 24, 2003

(65) Prior Publication Data

US 2005/0065714 A1 Mar. 24, 2005

(30) Foreign Application Priority Data

Jan. 18, 2002 (DE) ................................ 102 01 859

(51) Int. Cl.
*G01C 21/00* (2006.01)
*G01C 21/26* (2006.01)

(52) U.S. Cl. ........................ 701/200; 701/207; 701/212; 701/23; 455/456.1; 455/456.6; 707/E17.108

(58) Field of Classification Search ................. 701/200, 701/213, 207, 23, 212; 455/456.1, 456.6; 707/E17.108; *G06F 17/30*
See application file for complete search history.

(56) References Cited

U.S. PATENT DOCUMENTS 4,827,419 A * 5/1989 Selby, III .................... 701/200
5,087,916 A * 2/1992 Metzdorff et al. ............. 342/64
5,426,780 A * 6/1995 Gerull et al. .................. 707/3
5,546,578 A * 8/1996 Takada .......................... 707/5
5,594,650 A * 1/1997 Shah et al. .................. 701/207
5,634,049 A * 5/1997 Pitkin ......................... 707/102
5,636,122 A * 6/1997 Shah et al. .................. 701/207
5,754,938 A * 5/1998 Herz et al. .................. 725/116
5,754,939 A * 5/1998 Herz et al. ................. 455/3.04
6,047,327 A * 4/2000 Tso et al. .................... 709/232
6,101,496 A * 8/2000 Esposito ........................ 707/6
6,154,745 A * 11/2000 Kari et al. ................... 707/100
6,169,515 B1 1/2001 Mannings et al.
6,456,737 B1 * 9/2002 Woodfill et al. ............. 382/154
6,571,279 B1 * 5/2003 Herz et al. .................. 709/217
6,608,892 B2 * 8/2003 Shaffer et al. .......... 379/207.12
6,633,807 B2 10/2003 Augsburger et al. ........ 701/115
6,944,679 B2 * 9/2005 Parupudi et al. ............ 709/246
7,136,474 B2 * 11/2006 Shaffer et al. .......... 379/211.02
7,203,300 B2 * 4/2007 Shaffer et al. .......... 379/220.01
7,233,799 B2 * 6/2007 Spain, Jr. ................. 455/456.1
7,266,085 B2 * 9/2007 Stine .......................... 370/252
2002/0059226 A1 * 5/2002 Cooper .......................... 707/6
2004/0093157 A1 5/2004 Muller et al.

FOREIGN PATENT DOCUMENTS

| | | | | |
|---|---|---|---|---|
| DE | 3774422 | G | * | 12/1991 |
| DE | 695 06 563 | | | 5/1999 |
| DE | 100 34 109 | | | 9/2001 |
| DE | 10008889 | A1 | | 9/2001 |
| EP | 276336 | B1 | * | 7/1988 |
| EP | 0410137 | B1 | | 11/1994 |
| WO | WO 00/70504 | A | | 11/2000 |
| WO | WO 01/82113 | A | | 11/2001 |

OTHER PUBLICATIONS

R. Fiset et al., An automatic road extraction method using a map-guided appoach combined with neural networks for cartographic database validation purposes, International Geoscience and Remote Sensing Symposium, May 1996, IGARSS'96. Remote Sensing for.*
S. Kamijo et al., Digital road map database for vehicle navigation and road information systems, Conference Record Vehicle Navigation and Information System Conference, Sep. 11-13, 1989, pp. 319-323.*
M. Sutter et al., Automated generation of visual simulation databases using remote sensing and GIS, Proceedings, IEEE Conference on Visualization, Oct. 29-Nov. 3, 1995, pp. 86-93.*
S. Basagini, I. Chlamatac, and V. Syrotiuk, "A Distance Routing Effect Algorithm for Mobility (DREAM)," Proceedings of the 4th c Annual IEEE/ACM Conference on Mobile Computing and Networking, 1998, pp. 76-84. cited by other.*
Cong et al., Hybrid TDOA/AOA Mobile user Location for Wideband CDMA Cellular Systems, IEEE Transactions on Wireless Communications, IEEE, Jul. 2002, pp. 439-447, vol. 1, No. 3. cited by other.*
Dan Chalmers, Morris Sloman., "QoS and Context Awareness for Mobile Computing," Handheld and Ubiquitous Computing First International Symposium, HUC'99, Karlsruhe, Germany, Sep. 27-29, 1999 Proceedings, pp. 380-382.*
Hansson, H.A. et al., "Basement: A Distributed Real-Time Architecture for Vehicle Applications" Proceedings of Real-Time Technology and Applications Symposium, May 15-17, 1995 pp. 220-229.*
Chatschik Bisdikian et al., "WiSAP: A Wireless Personal Access Network for Handheld Computing Devices," IEEE Personal Communications, Dec. 1998, vol. 5 No. 6, pp. 18-25.*
Karimi and Liu, "A Predictive Location Model for Location-Based Services" 2003 ACM pp. 126-133.*
Maass Henning, "Location-aware mobile applications based on directory services" Mobile Networks and Applications 3 (1998) Baltzer Science Publishers BV pp. 157-173.*
Dix et al., "Exploiting Space and Location as a design Framework for Interactive Mobile Systems" vol. 7 No. 3 Sep. 2000 ACM pp. 285-321.*
Lawton et al., "An Interactive Model Based Vision System for Vehicle Tracking," 1993, pp. 403-409.*
Fulton, Jennifer, "Computer Maintenance, Part 1 First Step: Spring Cleaning," TOGGLE, Dec. 1999, pp. 1-3.*
Bahl P. and Padmanabhan V., "User Location and Tracking in an In-Building Radio Network", Technical Report MSR-TR-99-12, Microsoft Research, Feb. 1999.*
Nelson G. J., "Context-Aware and Location Systems", Ph. D. Dissertation, University of Cambridge, Jan. 1998.*
Printout of web site for www.goapr.com—in particular http://www.goapr.com/Audi/index.html.
Printout of web site for www.goapr.com—in particular http://www.goapr.com/Audi/products/directport.html.

* cited by examiner

*Primary Examiner*—Cuong Nguyen
(74) *Attorney, Agent, or Firm*—Buchanan Ingersoll & Rooney PC

(57) ABSTRACT

Disclosed is a method for supplying a program-aided information system with specific location information, in which the information system provides at least one selection of certain location-dependent information on the basis of a person-specific or object-specific location which is detectable by a sensor.

The present invention is distinguished by the combination of the following steps:
- detection of positional data for a person-specific or object-specific location by a sensor,
- transformation of said sensor-detected positional data into a location representing form, which is associated with a reference system, within which said positional data can be spatially attributed, as well as being associated with a hierarchical structure,
- combination of said location representing forms in a location set and/or in form of positional vectors in which said positional data of at least two locations are linked in a prescribed order, and/or
- formation of location relations and/or positional vector relations between the locations, persons or objects within so-called positioned location sets, and
- application of operations for determining the matching of locations as a basis of generating or providing location-dependent person-specific or object-specific information.

15 Claims, 3 Drawing Sheets

METHOD FOR SUPPLYING A PROGRAM-AIDED INFORMATION SYSTEM WITH SPECIFIC POSITIONAL INFORMATION

TECHNICAL BACKGROUND

The present invention relates to a method for supplying a program-aided information system with specific positional information, in which the information system provides at least one selection of certain positional information on the basis of a person-specific or object-specific position which is detectable by a sensor.

Such type methods are based on program models for handling positional information in computer programs, which provide their users information based on where they are currently located or where they will be located in the future. In these computer programs, users receive exactly that information they actually require at the time and at the location where the respective need arises.

The dimension "location" therefore takes on an essential aspect by means of which supplying users with information is optimized in such type computer programs. This aspect plays a significant role in various ways. For instance, users' need for certain information is, for example, dependent on where the user him/herself is located. Certain information is only needed at certain locations. Furthermore, the information itself which can be potentially provided to a user may in some cases be related to a location, i.e. it is relevant only for certain locations or it possesses at a certain location greater information content for the users. Even communication media, which employ such computer programs to provide a user with the desired information are dependent on where the user is located.

Therefore, such type computer programs must be able to process positional information in connection with users' information needs, the information itself, the communication media and finally with the current and future locations of the users and of other relevant objects. For this purpose, sensor systems are needed that are able to locate persons and objects. The information supplied by these sensors must also be representable and processable.

PRIOR ART

Presently, there are numerous computer programs available that provide information to users based on their current or future location. Such type programs are called Location Based Services and have all in common that they contain a data model for possible locations of persons and objects.

In principle, there are two possible ways to represent locations in a data model. They can be imaged in the form of geometric data, i.e. related to an n-dimensional coordinate system, or as symbolic data, i.e. as a set of symbols or names, which are linked via relationships. Although today most prior art systems are confined to one of the possible location representations, first attempts to integrate geographic and symbolic positions have been undertaken. However, the location models presently employed have a number of limitations, which make them unsuitable for supplying person-specific, needs-oriented information.

For one thing, these models and the systems in which they are utilized are based on users' static information needs which the system establishes itself. Users cannot or only to a limited extent influence these needs. Furthermore, at this time, a computer program usually utilizes only one single sensor system for locating. For this reason, each program only covers a narrow partial region of possible positional information.

The models used all employ a different semantic. Presently there is no known uniform representation of location in computer programs. Moreover, in particular, it is only possible to a limited extent to transform one location for which there is a certain form of representation into a location with another form of representation. This is especially the case with different symbolic locations. Such a transformation, however, is essential in order to adequately process positional information in the various represented areas in which it is relevant for supplying needs-oriented information.

Prior art programs have not yet or only unsatisfactorily solved providing information regarding the relationships of locations to each other important for the representation of locations, such as distance, inclusion relationships, i.e. checking whether a location is contained in another location, for example room 23 is included on the $2^{nd}$ floor of house X, and overlapping. Prior art programs also cannot or only to a small extent image relationships between locations and persons, respectively between locations and objects, i.e. individual information cannot be retrieved or supplied based on a person's or an object's current location.

SUMMARY OF THE INVENTION

Based on the aforedescribed state of the art, the object of the present invention is to provide a method of supplying a program-aided information system with specific positional information, in which the information system provides at least one selection of certain positional information on the basis of a sensor-detectable, person-specific or object-specific position, in such a manner that the method can be employed independent of the type or dimension of the sensor signals used for locating the respective person or the respective object. In particular, a computer-aided database structure for positions should be provided which permits simple and random adaptation to prior-art locating systems. Moreover, the intention is to improve the precision with which the determination of the location of a respective person or a respective object is carried out on the basis of the positional information acquired by a locating system. Finally, the aim is to provide selectively and specifically a located person, respectively a corresponding located object, with position-specific information.

The solution to the object of the present invention is set forth in claim 1. Advantageous further developing features of the inventive idea are given in the subclaims and, in particular, in the following description.

A key element of the present invention is that a method of supplying a program-aided information system with specific positional information, in which the information system provides a selection of certain positional information on the basis of a sensor-detectable, person-specific or object-specific location, comprises the following process steps:

In a first step, a technical locating system detects by means of sensors the position at which, for example, a person currently is located. The positional data acquired by sensors in this manner are then transformed into a location representing form, the positional data being associated with a reference system, within which the positional data can be attributed spatially, as well as being associated with a hierarchical structure.

The location representing forms, each associated with a corresponding reference system and with the hierarchy particular to the respective reference system, are then combined in a location set and/or in the form of positional vectors, in which the location representing forms of at least two locations are linked in a defined order. Alternatively to the preceding step of forming location sets, respectively of forming positional vectors, or also combinations thereof, subsequently location relations and/or positional vector relations between locations and persons, respectively between locations and objects, are formed within so-called positioned location sets in order to finally permit generating or providing location-dependent person-specific or object-specific information by carrying out operations if locations match, i.e. if positional data obtained by the position sensors and the locations stored in information requests match.

In the invented method, the positional data acquired by sensors are transformed into location representing forms, for example, in the form of the coordinate values of a reference system, by means of so-called sensor adaptors, which represent special parts of a computer program. The positional data transformed into such a type location representing form are grouped into location sets or positional vectors, which may be considered as the basic forms of representation of locations. Location sets are collections of unsorted location information which can either comprise one or a multiplicity of elements. Location sets containing exactly one element image so-called atomic locations, whereas location sets containing more than one element contain combined locations or lists of locations. The single locations, respectively positional information, in such location sets are linked via Boole's operators. Positional vectors contain locations in a fixed order on their nodes, permitting in this manner imaging routes. The edges in positional vectors provide information about the distance between the location nodes that they link. They can also be a location set or a positional vector.

A tree structure is provided for the order of the locations in relation to each other. The tree structure permits ordering locations hierarchically and thus imaging complex location structures and so-called inclusion relationships, i.e. it is possible to check whether, for example, a room x on floor y is located in a building z.

Contrary to the state of the art described in the introduction, locations themselves are not subdivided into different classes, respectively into different reference systems, such as, for example, a solely geographic (longitude, latitude) or solely symbolic (location name, street name, etc.) reference system. But rather, using sensor adaptors, the location model, respectively the method, associates every location with a reference system to which this location belongs. These reference systems contain the characteristics of the locations belonging to the system including their dimensions, admissible value ranges, the relationships of the dimensions to each other and to the dimensions of other reference systems.

Furthermore, the method provides transformation rules which operate on the reference systems and can transform locations from different reference systems into each other, thereby permitting checking locations for inclusion, parity or intermediate spaces both for locations based on the same reference system by this reference system and for locations with different reference systems based on the transformation rules.

Furthermore, the location model, respectively the method, defines the relationship of persons and objects to locations by modeling so-called prepositions. Prepositions can be attributed to locations of a location set or of a positional vector. Moreover, distance information can be added to the prepositions. Distances usually consist of one measuring unit, which may be a metric, temporal or positional unit, a quantity unit or an operator. Distances are also employed at other points in the location model, in particular, in the reference systems. Thus, it is possible to determine distances between locations and persons, respectively location and objects, and between single locations.

Moreover, the method is able to image the precision and the probability of positional data, which is, particularly relevant for integrating different position sensors, which often deliver positional data out of focus with respect to graininess and matching of the actual with the found location. Moreover, reference systems, admissible prepositions, distance data and value ranges can also be extended dynamically if a user program so requires.

Furthermore, the method makes it possible to manage information uniformly on locations with regard to position sensors, location-specific and/or person-specific information requests, communication channels and information even in computer programs. In this manner, computer programs are enabled to extend the dominating trend to personalization and individualization of the provided services and information even to the dimension location. Thus computer program users only receive the information they actually need and is relevant to them at the place where they are located.

The functionality provided by the method represents a considerable added value for users compared to present computer programs and offers their vendors considerable competitive advantages. These competitive advantages are augmented in that the present method and model can be dynamically extended and can be used in a great variety of fields of application. Thus, the invented method can be easily integrated in computer programs quickly and at little cost.

Moreover, computer program vendors can react quickly and cost-favorably to changing program demands. The invented model can also be particularly advantageously utilized in innovative applications in the so-called "intelligent internet". Here, the prevailing flood of information can be dammed by supplying information selectively; the information can also be processed and provided on the basis of location. As these types of applications are distinguished by a strong distribution of the data processing stations, the present method's ability to generate and to extend make it especially suited to provide a uniform platform for intelligent internet applications.

The invented process has already been successfully implemented in a trial model in a platform for providing person-specific traffic information. In this platform, the registered users are informed on the basis of the current traffic situation as they start out on a planned trip in order for them to arrive at a given destination at a given time taking into account buffer times between receiving the information and the time of departure as well as the user's preferred routes. Moreover, the user can also be provided with current information while driving with regard to the traffic situation on the route, possible traffic congestion and alternative routes based on where the user happens to be at the time. In this example, there is a location-based information request which says that a user would like to receive current congestion information for his route and his destination when he is driving on the highway. This information request, therefore, contains positional information in the form of "on the highway". In order to satisfy this request, the user is located by sensors after setting out on his journey. These sensor systems give the user's current location in the form of Gauss-Krüger geo-coordinates. The traffic information itself is provided with positional data in the form of highway abbreviations in connection with exit abbreviations and highway junctions. The location model is responsible for the imaging, management and transformation of this positional data into their different forms. The positional data highway, Gauss-Krüger coordinates and highway or exit/highway abbreviations are imaged in positioned objects which each relate to a semantic reference system for transport lines, respectively geo-coordinates. The user's preferred routes are imaged as positional vectors on the edges of which the means of transport is given. Whether the coordinates that supply a locating procedure match with the location specifications of the requested information is determined by means of transformation algorithms. Furthermore, when this is the case, these coordinates are transformed into the location format in the traffic information.

BRIEF DESCRIPTION OF THE DRAWINGS

The present invention is made more apparent in the following, without the intention of limiting the scope or spirit of the inventive idea, using preferred embodiments with reference to the accompanying drawings.

WAYS TO CARRY OUT THE INVENTION, COMMERCIAL APPLICABILITY

Figure 1:
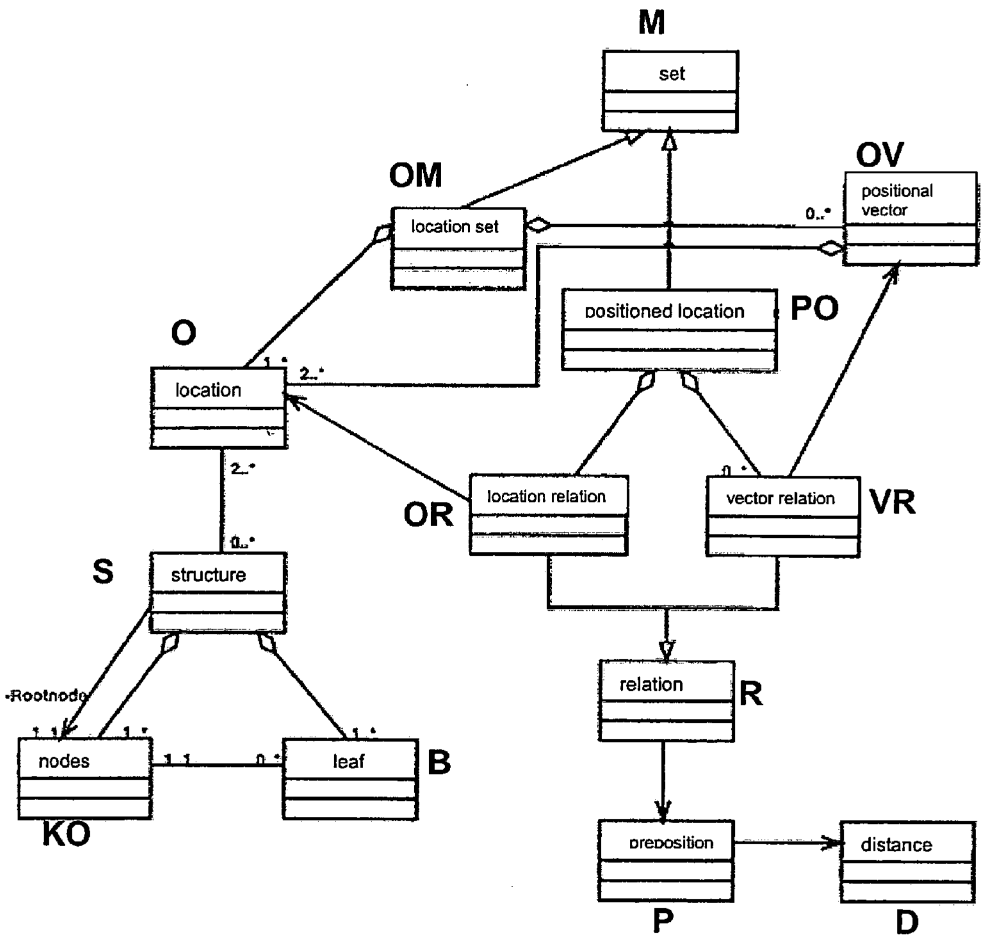
FIG. 1 shows a schematic representation of the structure of the method

FIG. 1 depicts a typical flow chart showing the structure and the relationships of the aforedescribed elements: location sets, positional vectors, prepositions, etc.

First, the location set OM, containing the locations and/or positional vectors, and the positional vectors OV, comprising at least two sensor-detected locations, are shown.

A structure S is associated with the locations O themselves. This structure S images the so-called inclusion relationships between the individual locations O. For this purpose, the structure S possesses nodes K and leaves B which form a tree thereby permitting a hierarchical order of the locations. For example, if the location is "room 1.29", which corresponds to a leaf contained in the "building of company X", which corresponds to a node contained for its part in the location "Dortmund", which corresponds to the node.

In addition to these solely positional data, the present method enables imaging prepositions P, i.e. relations between persons or object and locations, such as for example "in", "20 km before", "outside of". In order to permit this, the present method contains a positioned location set PO, which contains so-called location relations OR and can, moreover, contain vector relations VR. Location relations and vector relations correspond to the previously described location sets OM and positional vectors OV but extend them with the necessary propositions P. A location relation OR contains a location O and a preposition P which relates to this location O, for example "within a radius of 20 km of Munich". A vector relation VR contains analogously a positional vector OV and a respective preposition P, for example "on the way to work".

The class relation R ensures that the location relations OR and the vector relations VR are of the same type and permit passing down operations OP to location relations and vector relations. Relation R is associated with the described prepositions P. Prepositions P for their part may possess distance information D comprising quantity information, for example "within a radius of 20 km of Munich", a unit of measure, for example "km" and an operator, for example "within a radius of".

Figure 2:
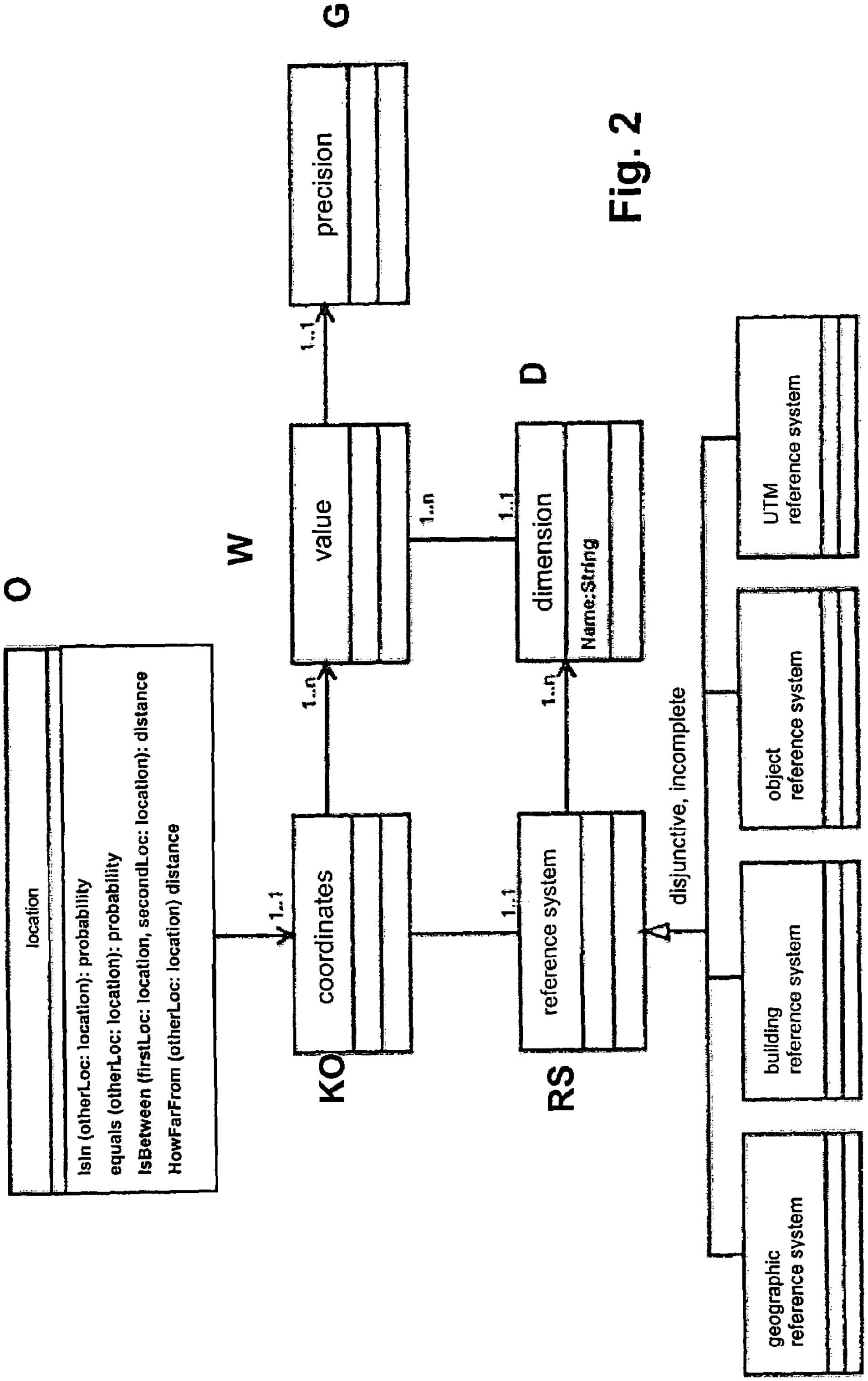
FIG. 2 shows the schematic representation of the reference systems.

FIG. 2 shows the order of the locations O to the reference systems RS. Each location O is described by a set of coordinates KO. These coordinates KO unequivocally fix the position of the location O inside the reference system RS. Coordinates KO do not only refer to physical coordinates, such as for example latitudes and longitudes supplied by GPS systems, but rather the coordinates of a location are any type of values relating to a dimension, for instance the room number with the value 1.29 or the dimension "city name" with the value Munich. Thus there are a number of alternative reference systems, in which coordinates define the position of a location, such as for example geographic RS, building RS, object RS or UTM-RS.

The method also takes into consideration the locating precision with which the different sensor systems operate to detect a location in that a specific precision G of the respective sensor system is associated with the values W of the sensor-detected coordinates.

In this way, it is possible to image that the single values W of the coordinates, for example, are the coordinates of the dimensions D "longitude and latitude" and the precision of the positional data is 10 m.

Thus, the coordinates KO relate exactly to one reference system RS given by the sensor system. This reference system RS prescribes which characteristics the respective coordinates KO must have. This occurs by presetting the dimensions D to which the values W of the coordinates KO relate and which at the same time define the valid value range.

Furthermore, the reference system RS determines which attributes locations contain. As each reference system has a source, this source assigns a hierarchically higher position or a higher system limit for each location. If it is helpful, the reference systems RS contain the relations between the locations of the reference system. For rooms, this can, for example, be a layout of the rooms imaged by the reference system showing the arrangement of the rooms.

Furthermore, the reference systems RS contain the transformation rules for transforming locations that relate to a reference system into locations with a different reference system and therefore different coordinates.

Moreover, the reference systems are linked to sensor adaptors, which are special parts of a computer program that receives the locating data from the sensors (GPS receivers, transponder systems, electronic appointment books, user entries, etc.) and transform them into the coordinate values of a reference system.

The invented method permits first and foremost to uniformly image possible locations in the computer program for supplying person-specific, needs-oriented information and thus to provide computer program users with relevant, location-dependent information.

The method, however, is of particular significance, if users' information requests depend on their current or predicted location. Such is the case if an information request only occurs at certain locations or if the information itself which is relevant to a user is defined by where the user is located.

In this case, the purpose of the invented method is to image current and future locations of users and objects. Furthermore, the method also images positional data in connection with the users' information request, for example "message, when Ms X enters the building" or "news about traffic congestion on my route". An important task of computer programs utilizing the invented method, is to check whether a current or predicted location matches the location conditions of a user's information request. For this purpose, data are obtained by sensors, which occurs by means of the above-mentioned sensor adaptors.

The sensors may be different type sensors. They can be roughly classified into genuine locating systems and derived locating systems. Genuine locating systems are sensors developed particularly for determining a location, such as for example GPS, transponder and infrared systems. Derived locating systems are systems which originally served another purpose than locating, but which can be employed to determine the location of persons and objects. Among them are, systems for determining working hours, electronic appointment books, room-occupation plans, explicit user entries, etc.

The sensor adaptors transform the determined data acquired by the locating systems into locations according to the structure of the locations in the location sets and positional vectors. Dependent on the type of sensor and its use (installation position, purpose of the computer program), the adaptors determine which reference systems are suited for imaging the employed sensor data. They transform the data acquired in this manner into coordinate values of the respective reference system. If the sensor data are directly available as coordinates of a reference system (for example in GPS coordinates or symbolic positions), direct imaging can occur on a location.

The thus imaged locations, if suited, are grouped into positional vectors and into location sets. The structure of the locations, i.e. hierarchically higher or lower locations are imaged via the sources of the reference systems. The acquired sensor data are grouped with the aid of the sensor properties, such as precision, and the properties of the reference systems are transformed into distance information corresponding to the model and grouped into positioned location sets via location relations and vector relations.

An example: locating a person by ultrasonic means in a room at 3 m horizontally from the left upper corner and 4 m vertically from the left upper corner of the room. Locating precision is 10 cm. The object reference system of the room is a chair at 3.5 m horizontally and 4 m vertically. From this, the location of the chair is derived with the distance 50 cm.

None or only a few sensor adaptors are needed for the positional data contained in the so-called information requests, i.e. the information requests are stored for each single user or object in a computer-aided file in which the respective information request for each location is stored, because the positional data are usually available in symbolic form or in rare cases as physical coordinates. Imaging the location sets and positional vectors, structures and prepositions occurs analogously.

If the positional data acquired by the sensors or established in the information requests are imaged according to the invented method, operations can occur on the positional data. These operations allow a computer program to determine which information is relevant for the user on the basis of his/her location. For this, first of all the positional data in the information requests must be compared with the locations detected by the sensors. For this purpose, the model contains operations such as isIn( ), equal( ), howFarFrom( ), etc. These operations, which are conducted on the locations, permit determining whether the locations are the same, whether a location is contained in another one or how far locations are apart.

Transformation rules are employed to carry out these operations if the locations relate to different reference systems. First a suited transformation rule is found to transform the locations into a uniform reference system. Depending on the reference system, a uniform representation in the form of physical coordinates or by transformation of the coordinates of one location into the coordinates belonging to the reference system of another location by means of stored imaging data, for example "building XY" corresponds to "Musterstr. 10, 12345 Musterhausen, BRD" or imaging rules, for example algorithms for transforming GPS data from a UTM system into GPS data from a WGS84 system.

On the basis of this uniform form of representation, the parity of two locations can be determined directly. Although two locations are not the same but some parts may overlap, as the result of such a comparison, the method provides probability data with which such overlappings are imaged. The distance between locations is converted on the basis of physical coordinates or via the properties of the respective reference system (for example position and dimensions of rooms in a building) into metric distances or intervals. Intervals relate to a specific travelling velocity.

Furthermore, the described method permits comparing positional data detected by sensors with the positional data of users' information requests either explicitly passed on by the user to the computer program or implicitly determined by the same. The result of such a comparison allows the computer program to determine whether a user who is at a certain location needs information and if so what information is relevant for the user taking into account his location.

Figure 3:
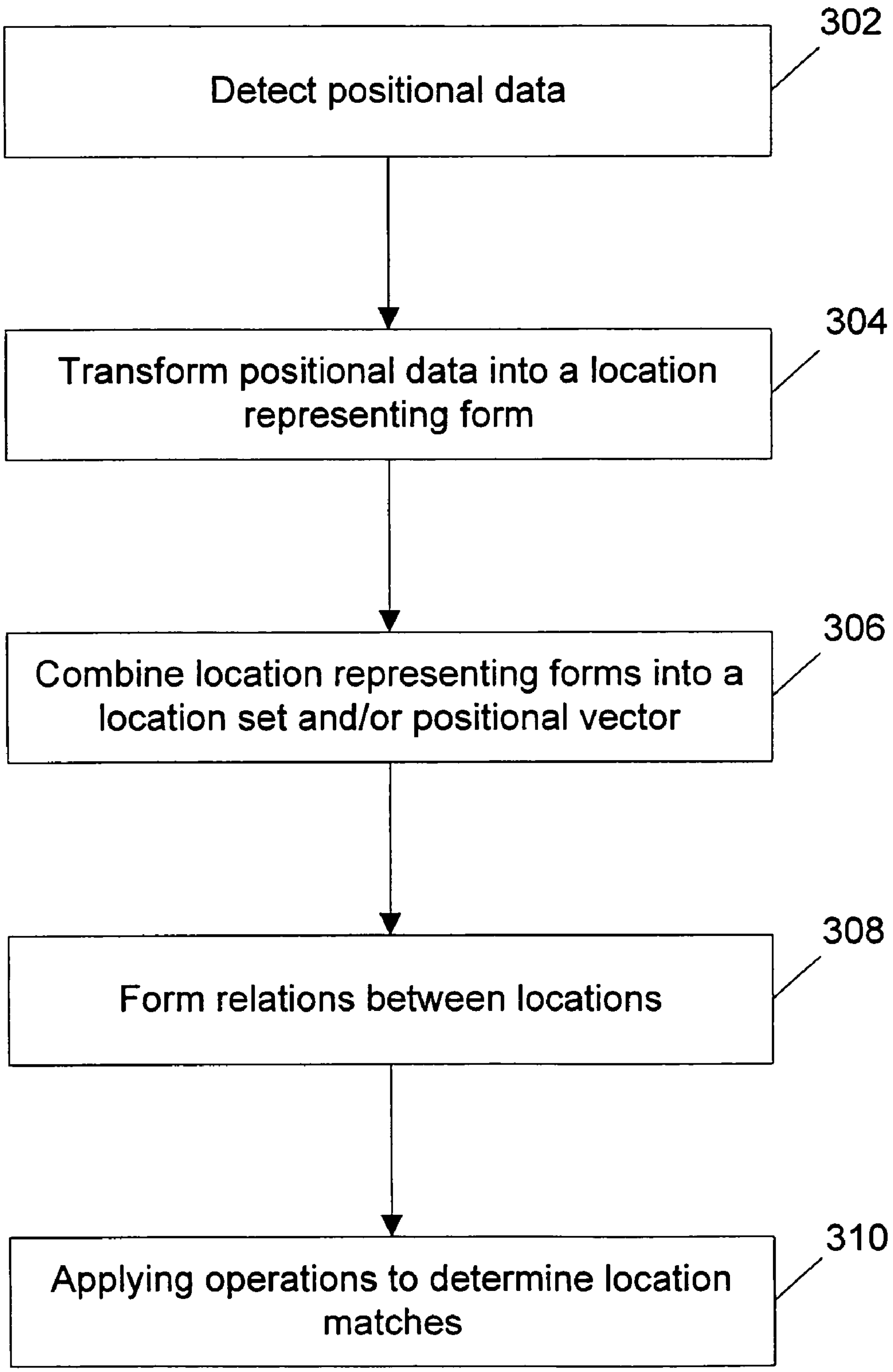
FIG. 3 shows a schematic representation of a method of supplying location information.

FIG. 3 is a flowchart that shows a schematic representation of a method of supplying location information.

What is claimed is:

1. A method for supplying a program-aided information system with specific location information, in which the information system provides a selection of location-dependent information based on at least one of a plurality of person-specific or object-specific locations, wherein a first location is detectable by a first sensor having a first reference system and a second location is detectable by a second sensor having a second reference system, the method comprising:

detecting positional data for at least one of the plurality of person-specific or object-specific locations through an associated sensor;

transforming said sensor-detected positional data into corresponding location representing forms using at least one sensor adaptor which establishes a single reference system from the first and second reference systems, within which positional data of the plurality of person-specific and object-specific locations being spatially attributed and associated with a hierarchical structure;

combining said location representing forms in a location set based on the single reference system:

forming location relations between any combination of locations, persons or objects within the location sets, which includes identifying a distance relationship and hierarchical relationship between each location, person, or object in the location set; and applying operations for determining the matching of locations as a basis of generating or providing location-dependent person-specific or object-specific information.

2. The method of claim 1, wherein said sensor detection of said positional data is conducted by means of technical locating systems.

3. The method of claim 1, wherein said transformation of said sensor-detected positional data into a location representing form occurs using at least one sensor adaptor which establishes said single reference system associated with the respective positional data.

4. The method of claim 3, wherein said sensor-detected positional data are transformed into a location representing form in the manner of coordinate values within the single reference system.

5. The method of claim 1, wherein information or characteristics of the person locations associated with the respective location representing forms of the sensor-detected locations are stored in the respective reference system associated with each sensor.

6. The method of claim 1, wherein said locations are associated with the hierarchical structure in the form of a tree structure.

7. The method of claim 1, wherein said sensor-detected positional data are combined in a random order in said location set.

8. The method of claim 1, wherein the information requests are stored in the form of computer-aided data, and on the basis of said operations it is determined whether the positional data contained in said information requests match the positional data acquired by the position sensors.

9. The method of claim 1, wherein said location representing forms are associated with information regarding a precision, with which the positional data is acquired by said technical locating system, and are associated with information regarding distances within the reference system.

10. The method of claim 9, wherein said positional data associated with information regarding the precision and the distances within said location relations.

11. The method of claim 8, wherein said operations check whether the location representing forms acquired from the sensor data and said locations in said information requests match or whether there is an inclusion relationship, and matching or numerical information regarding the spatial distance of said location representing forms acquired from the sensor data and said respective location-dependent information requests is determined.

12. A method for supplying a program-aided information system with specific location information, in which the information system provides a selection of location-dependent information based on person-specific or object-specific locations, wherein a first location is detectable by a first sensor having a first reference system and a second location is detectable by a second sensor having a second reference system, the method comprising:

detecting positional data for at least one of the plurality of person-specific or object-specific locations through an associated sensor;

transforming said sensor-detected positional data into corresponding location representing forms using at least one sensor adaptor which establishes a single reference system from the first and second reference systems, within which positional data of the plurality of person-specific and object-specific locations can be spatially attributed and associated with a hierarchical structure;

combining said location representing forms into a form of positional vectors in which said positional data of at least two locations are linked in a prescribed order based on the single reference system;

forming positional vector relations between any combination of locations, persons, or objects within the location sets, which includes identifying a distance relationship and hierarchical relationship between each location, person, or object in the location set; and applying operations for determining the matching of locations as a basis of generating or providing location-dependent person-specific or object-specific information.

13. The method of claim 12, wherein said location representing forms are associated with information regarding a precision, with which the positional data is acquired by said technical locating system, and are associated with information regarding distances within the reference system.

14. The method of claim 12, wherein, in said combining step, said positional vectors have at least two nodes at which a sensor-detected location is provided in a fixed order, and a connection is provided between two said nodes, along said connection information regarding the route between two locations being linked, if need be, in the form an additional location set and/or an additional positional vector.

15. The method of claim 13, wherein said positional vector relations are grouped in said positioned location sets and are associated with so-called prepositions, which describe a spatial relative position between locations and persons, respectively between said locations and objects, numerically and/or semantically.

* * * * *

UNITED STATES PATENT AND TRADEMARK OFFICE

CERTIFICATE OF CORRECTION

PATENT NO. : 7,392,131 B2
APPLICATION NO. : 10/502035
DATED : June 24, 2008
INVENTOR(S) : Sandra Haseloff It is certified that error appears in the above-identified patent and that said Letters Patent is hereby corrected as shown below:

Title page, item [73], under Assignee, change "Franuhofer-Gesellschaft" to --Fraunhofer-Gesellschaft--.

Signed and Sealed this

Seventeenth Day of February, 2009

JOHN DOLL
*Acting Director of the United States Patent and Trademark Office*